W. P. SCHERER.
TOASTING AND BROILING PAN.
APPLICATION FILED FEB. 1, 1909.
965,755.
Patented July 26, 1910.
2 SHEETS—SHEET 1.
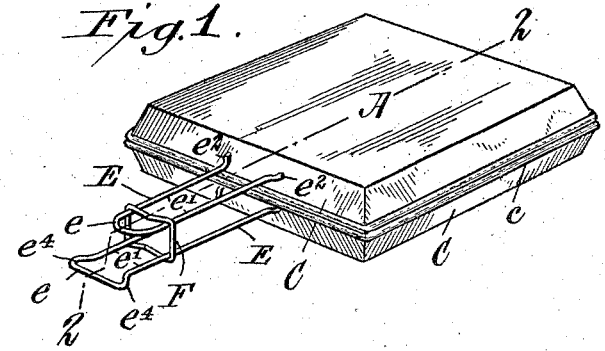
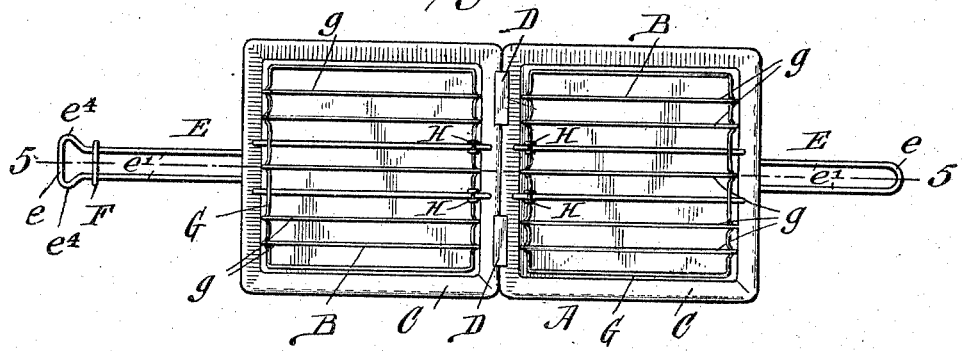
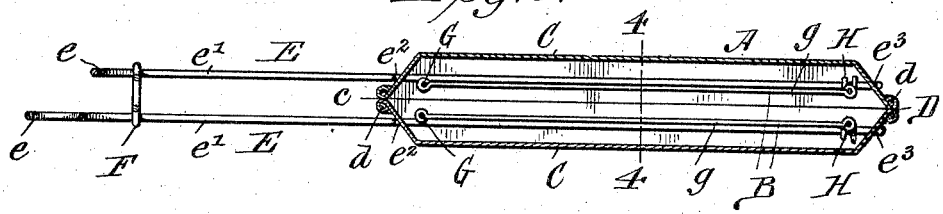
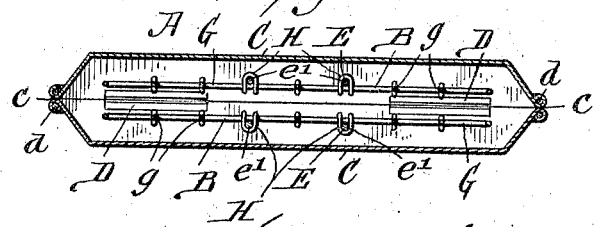
Witnesses:
Christ Peinle, Jr.
Matilda C. Sticht
William P. Scherer, Inventor.
By Emil Neuhart,
Attorney.
THE NORRIS PETERS CO., WASHINGTON, D. C.

W. P. SCHERER.
TOASTING AND BROILING PAN.
APPLICATION FILED FEB. 1, 1909.

965,755.

Patented July 26, 1910.
2 SHEETS—SHEET 2.

Witnesses:
Christ Finle, Jr.
Matilda C. Sticht

William P. Scherer, Inventor.
By Emil Neuhart,
Attorney.

UNITED STATES PATENT OFFICE.

WILLIAM P. SCHERER, OF BUFFALO, NEW YORK, ASSIGNOR TO MARY AGNES CARROLL, OF BUFFALO, NEW YORK.

TOASTING AND BROILING PAN.

965,755.  Specification of Letters Patent.  Patented July 26, 1910.

Application filed February 1, 1909. Serial No. 475,431.

*To all whom it may concern:*

Be it known that I, WILLIAM P. SCHERER, a citizen of the United States, residing at Buffalo, in the county of Erie and State of New York, have invented certain new and useful Improvements in Toasting and Broiling Pans, of which the following is a specification.

My invention relates to improvements in toasting and broiling pans, and it has for its object to provide such a device whereby bread may be toasted, and meat and other articles of food broiled without the obnoxious fumes and soot of the gas or other fuel coming in contact with the food.

This invention therefore has for its object the production of a pan or utensil which is of simple construction, cheap to manufacture, and durable and efficient in the use for which it is intended.

It also has for its object the provision of such a pan which can be readily and thoroughly cleansed owing to all parts thereof being easily accessible.

With these and other objects in view, my invention consists of coöperating pan-parts or closures, with each part provided with a food-supporting rack arranged so that all parts of the pan or casing can be conveniently cleansed, and so that all parts of the racks are accessible for the same purpose.

It also consists in the construction, arrangement and combination of parts to be hereinafter described and particularly pointed out in the subjoined claims.

In the accompanying drawings, I have illustrated my improved toasting and broiling-pan in its preferred form, wherein,—

Figure 5:
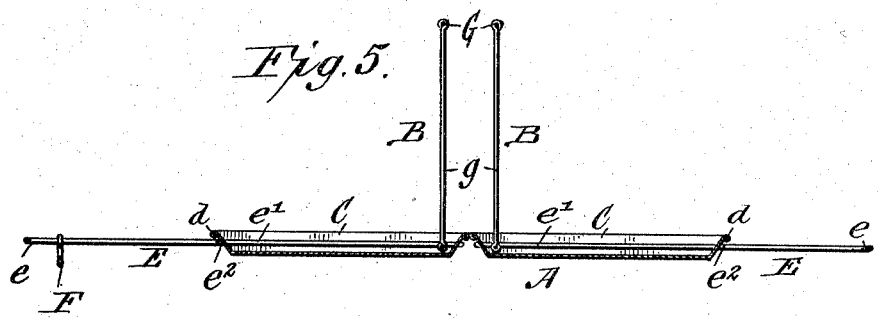
Figure 6:
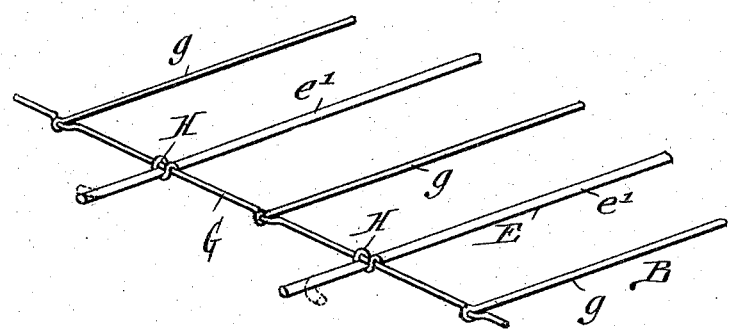
Figure 7:
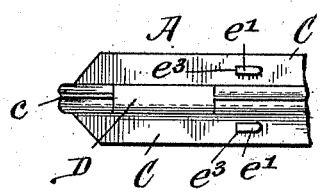

Figure 1 is a perspective view of the complete pan or utensil as it appears when closed. Fig. 2 is a plan view of the same as it appears when open. Fig. 3 is an enlarged longitudinal section of the pan taken on line 2—2, Fig. 1. Fig. 4 is a transverse section taken on line 4—4, Fig. 3. Fig. 5 is a longitudinal section taken on line 5—5, Fig. 2, with the food-supporting racks swung upward to render the pan-parts accessible for cleansing. Fig. 6 is a perspective view of a portion of one of the food-supporting racks and the handle-bars to which it is secured. Fig. 7 is a rear view of a portion of the pan when closed, showing the manner of hinging the pan-parts together and the method of fastening the ends of the handles to the pan.

Referring now to the drawings in detail, like letters of reference refer to like parts in the several figures.

The pan comprises essentially a casing A and food-supporting racks B located and pivotally slidably held within the casing. The casing preferably consists of two pan-like parts C in opposed relation so that their edges are brought in contact, as at $c$. These parts are pivotally connected at their rear edges in any practicable manner so that they may be swung open, as shown in Figs. 2 and 5, or so that they may be swung into closed position, as best shown in Figs. 1 and 3, the pivots being preferably at the edges of the bounding walls of said pan-like parts.

The particular form of pivotal connection between the pan-parts herein shown, while not considered essential, is thought to be well adapted for connecting the pan-parts together, and it consists of a metallic strap D surrounding the strengthening wires $d$ at the edges of the pan-parts. Through each pan-part is a handle-member E constructed of stiff wire bent between its ends, as at $e$, to form two strands $e^1$ which are passed through the front and rear walls of the pan-parts, and offset, as at $e^2$, directly outside of the front wall and having their ends projecting through the rear wall and bent against said wall, as at $e^3$. The offset portions $e^2$ of said handles serve to prevent rearward movement of the handle-members while the bent projecting ends prevent forward movement thereof. In this manner the handle-members are rigidly secured to the pan-parts. A clamping-loop F is provided which is adapted to embrace the two handle-members when the pan is closed, and its purpose is to lock the two pan-parts together. One of said handle-members is longer than the other and widened laterally at its front end, as at $e^4$, so that the clamping-loop F cannot slip over said end; and by reason of one of said handle-members being longer than the other, said loop may be slipped over the end of the shorter member to permit of opening the pan.

The food-supporting racks B are made to conform to the shape of the pan-parts so that they will fit properly within the same, and they are preferably formed of a frame G made of wire and having a number of wires *g* supported thereby. In the particular form of pan herein shown, the pan-parts are made of rectangular shape, and the frames of the food-supporting racks are likewise of rectangular form; the wires *g* being arranged parallel with the handle-members and connected at their ends to opposite sides of the frames G. The food-supporting racks receive support from the handle-members, and they are pivotally and slidably connected thereto by means of wire clips H free to move lengthwise thereon, as best shown in Fig. 6; said racks being connected adjacent the pivotal connection of the pan-parts but in planes above or below said pivotal connection so that when the upper pan-part is being swung into open position, the rear bounding wall thereof will cause the rack carried by said part to rise from the food resting on the lower rack and swing with said pan-part until the latter is swung into horizontal position, at which time the rack carried thereby will have assumed an inclined position permitting free access to the food. This provides for the lifting of the upper rack with the opening of the upper pan-part so that it will not be necessary to lift the same by hand, thereby avoiding all possibility of the user burning his or her hands by coming in contact with the heated rack. By thus constructing the device, the racks may, at any time, be swung into vertical position as shown in Fig. 5. When the racks are in this position, the pan-parts may be easily cleansed, as well as the racks, and when desired, the food-racks may be moved lengthwise on the handle-members so that access may be had to every portion of the pan-parts.

When the pan-parts are swung into open position, the article of food to be toasted or broiled is laid upon one of the racks and the pan-part containing the other rack is swung over the food so that it is clamped between the two racks. The clamping-loop F is then slid over the shorter member of the handle to lock the pan in closed position. The pan is thus closed and locked in place over the fire, and when the article of food is toasted or broiled on one side, the pan may be reversed for the purpose of properly toasting or broiling the other side of the food.

This invention is particularly desirable for toasting or broiling over a natural-gas flame, as the casing excludes the obnoxious gases from the food and prevents the gaseous grease and the soot of the gas from lodging on the food.

A piece of bread toasted with this culinary utensil is more palatable than bread toasted with open toasting-utensils, and it is also more easily digested owing to its being free from all foreign substances, such as lodge upon or enter the bread during the toasting action when using an open toasting utensil.

Having thus described my invention, what I claim is,—

1. A toasting or broiling utensil comprising a two-part casing and a food-supporting rack pivotally and slidably supported within each part of said casing.

2. A toasting or broiling-utensil comprising a casing formed of two pan-like parts hinged together and one inverted on the other when closed, and a food supporting-rack pivotally supported within each of said pan-like parts and having its pivotal point adjacent the hinged edges of said parts.

3. A toasting or broiling utensil comprising a casing formed of two pan-like parts hinged together, each having a handle-member, and a food-supporting rack pivotally and slidably secured to each of said pan-like parts.

4. A toasting and broiling-utensil comprising a casing formed of two parts hinged together, each part having a handle member, and a food-supporting rack pivotally attached to each pan-part at a point nearer the hinged edge thereof than the edge directly opposite.

5. A toasting and broiling implement comprising a casing formed of two pan-like parts hinged together and having coöperating handle-members extending thereinto, means for locking said parts together, and food-supporting racks pivotally held to said handle-members within said pan-like parts so that they may be swung upward through an arc of a circle when said casing is open.

6. A toasting and broiling utensil comprising a casing formed of two pan-like parts pivotally connected, each pan-like part having a handle-member formed of wire bent between its ends to provide two strands and having said strands passed through said pan-like parts, and food-supporting racks pivotally connected to said handle-members and supported thereby.

7. A toasting and broiling utensil comprising two hinged pan-like parts having handle-members secured thereto and a loop adapted to embrace said handle-members for locking said pan-like parts together, each handle-member being formed of wire bent between its ends to provide two strands extending through its coöperating pan-like part and being offset outside of the front wall of said pan-like part and having the rear ends of said strands projecting through the rear wall thereof and bent at right-angles to bear against said rear wall, and food-supporting racks pivotally connected to said handle-members within said pan-like parts and supported by said members.

8. A toasting and broiling-utensil comprising a casing formed of two pan-like parts hinged together and having coöperating handle-members, and food-supporting racks pivotally attached to said pan-parts in planes on opposite sides of the hinged edges thereof.

9. A toasting and broiling-utensil comprising two parts hinged together, and a food-supporting-rack pivotally attached to each part, said racks being pivoted relative to the hinge of said parts to swing in the same direction as said parts.

10. A toasting and broiling utensil comprising two pivotally-connected pan-like parts, and food supporting-racks pivotally supported in planes between the bottom and edges of said parts and close to the point of pivotal connection thereof.

In testimony whereof, I have affixed my signature in the presence of two subscribing witnesses.

WILLIAM P. SCHERER.

Witnesses:
MATILDA C. STICHT,
CHRIST FEINLE, Jr.